July 13, 1954     T. A. ÖDMAN     2,683,350
HYDRODYNAMIC POWER TRANSMISSION COMPRISING CONTROL
MEANS FOR CONTROLLING THE RATE OF CIRCULATION
OF THE WORKING FLUID IN THE CIRCUIT
Filed March 11, 1950     4 Sheets-Sheet 1
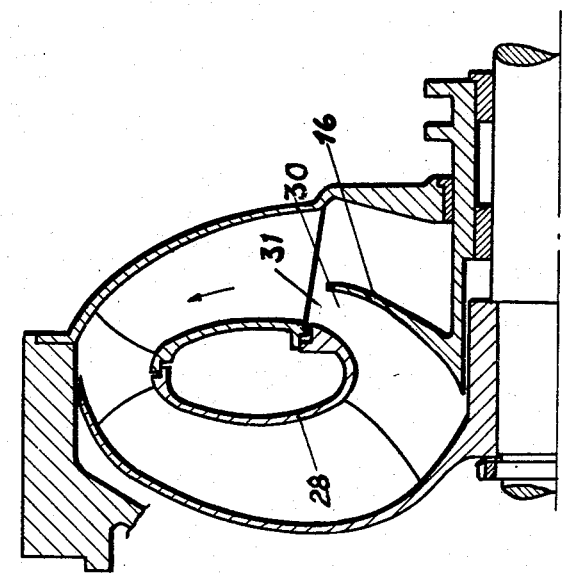
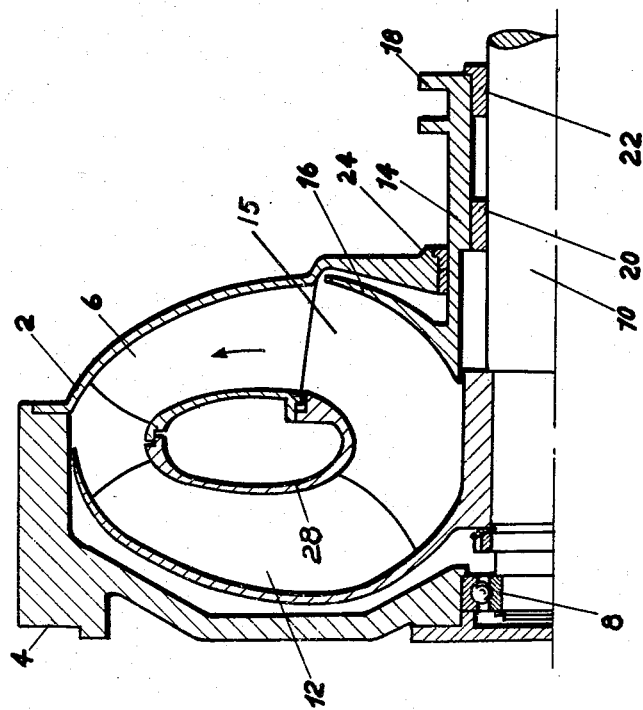
INVENTOR
Tor Axel Ödman
BY
ATTORNEY July 13, 1954             T. A. ÖDMAN             2,683,350
HYDRODYNAMIC POWER TRANSMISSION COMPRISING CONTROL
MEANS FOR CONTROLLING THE RATE OF CIRCULATION
OF THE WORKING FLUID IN THE CIRCUIT
Filed March 11, 1950             4 Sheets-Sheet 2
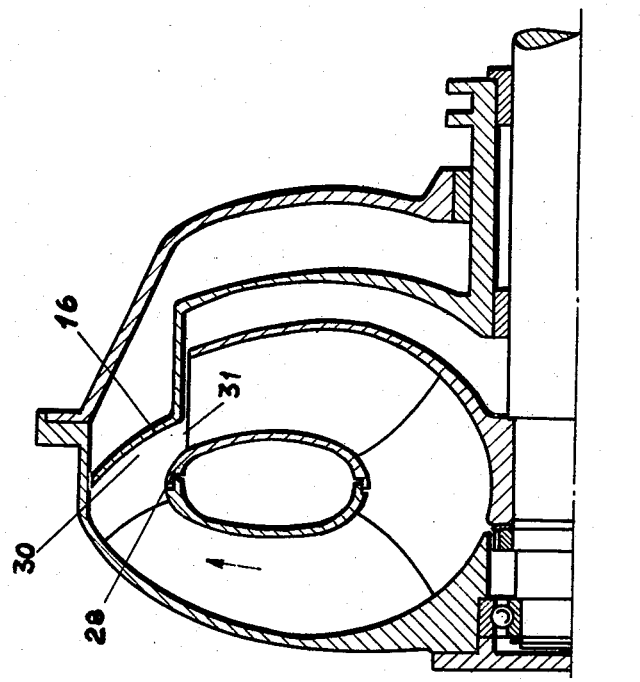
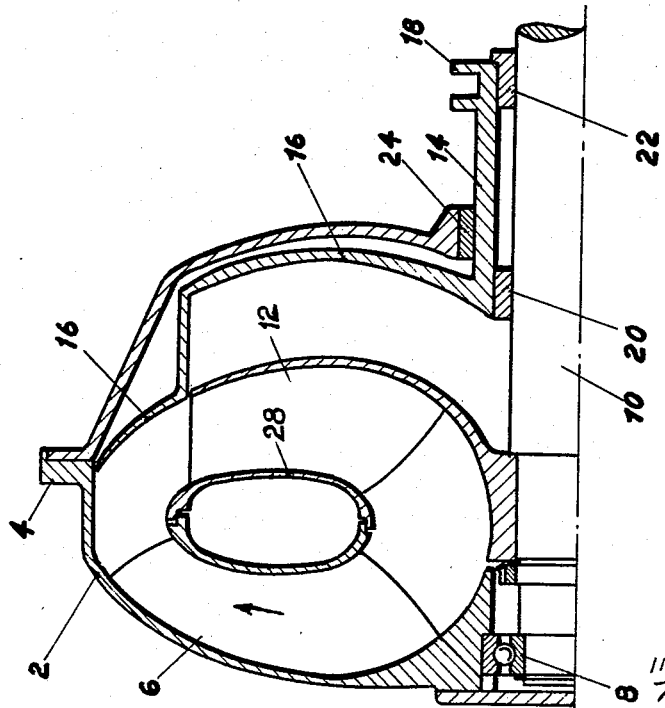
INVENTOR
Tor Axel Ödman
BY
Jarvis C. Marble
his ATTORNEY

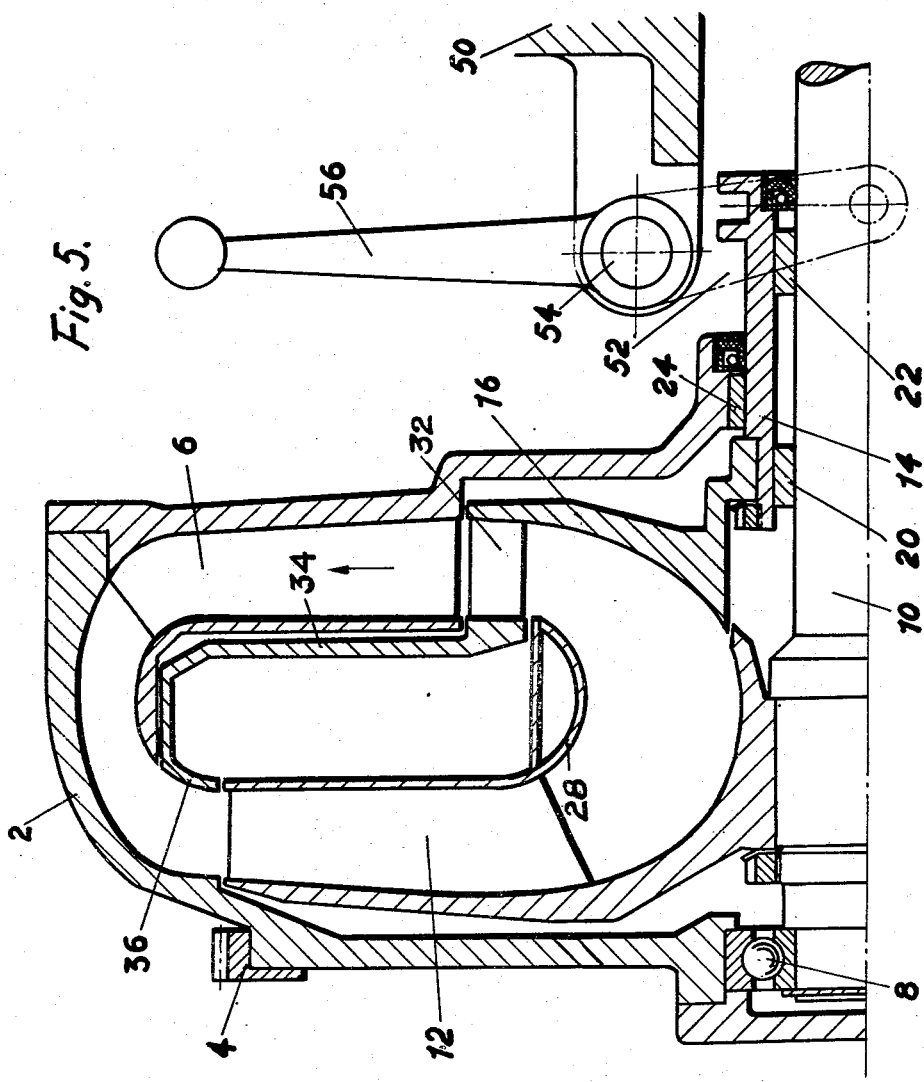

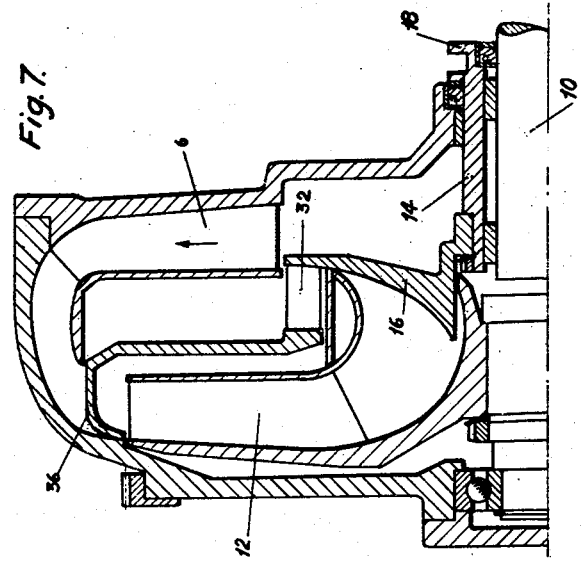
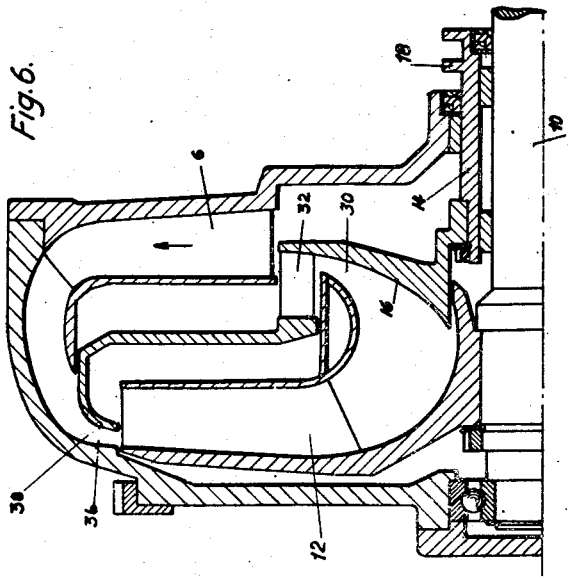

Patented July 13, 1954

2,683,350

UNITED STATES PATENT OFFICE 2,683,350

HYDRODYNAMIC POWER TRANSMISSION COMPRISING CONTROL MEANS FOR CONTROLLING THE RATE OF CIRCULATION OF THE WORKING FLUID IN THE CIRCUIT

Tor Axel Ödman, Stockholm, Sweden, assignor, by mesne assignments, to Jarvis C. Marble, New York, N. Y., Leslie M. Merrill, Westfield, N. J., and Percy H. Batten, Racine, Wis., as trustees Application March 11, 1950, Serial No. 149,102

Claims priority, application Sweden March 12, 1949

13 Claims. (Cl. 60—54)

The present invention relates to hydrodynamic transmissions, particularly couplings, of the closed circuit type in which the quantity of working fluid circulated per unit time can be controlled from a maximum value determined by the design and speed of operation of the device, to a value of zero or approximately zero in order to control the torque transmitting capacity of the coupling. More particularly the invention relates to such couplings of the kind particularly designed to transmit torque from a source of power operating at constant or substantially constant speed.

Control of the torque transmitting capacity of couplings of the kind under consideration is broadly known in the art and heretofore has generally been accomplished in one or the other of two different ways, i. e., by varying the amount of working fluid in the circuit, or by throttling the flow of fluid in the circuit by means of an adjustable valve like meter acting more or less in the manner of a gate valve to block the circuit to a variable extent. The former method has numerous deficiencies among which is the time element involved in filling or emptying the circuit to the extent required to effect the desired power transmitting adjustment. The latter method is also unsatisfactory except for those cases where it is sufficient to operate either with a fully open circuit or to cut off operation entirely by fully closing the circuit, since while with valve members of the kind heretofore used, partial blocking of the circuit is possible, practical operation has demonstrated that partial adjustments of the blocking member usually result in sudden and unpredictable changes in the power transmitting capacity of the coupling, with different power transmitting capacities frequently being obtained with like adjustments. The reason for this unsatisfactory action is due primarily to the intense and uncontrollable turbulence set up in the circuit by the insertion into the circuit to varying extents of valve or blocking members of the kind heretofore used.

The present invention therefore has as its general object the provision of novel apparatus for controlling flow through a coupling circuit which will enable reliable control of the power transmitting capacity of the coupling to be obtained with smooth transition from one capacity to another and with practically instantaneous change in capacity upon actuation of the control means. While the invention is hereinafter described as applied to couplings of the constantly filled kind, it may also be employed in conjunction with emptying and filling means should the latter for any reason be desirable. Ordinarily, however, the results obtainable with a constantly filled coupling embodying this invention will make such type preferable, eliminating among other things the cost and complexity of means for emptying and filling and also avoiding the time lag incident to the operation of the latter.

In order to accomplish the above and other and more detailed objects and advantages, the invention contemplates the provision of a movable throttling member operative upon adjustment to create in one or more places in the circuit a nozzle-like constriction of decreasing flow area in the direction of flow, terminating in the minimum flow area called for by the adjusted condition, which may be a fully throttled condition.

For a better understanding of the more detailed nature of the invention and the manner in which it may advantageously be carried into effect, reference may best be had to the ensuing portion of this specification and the accompanying drawings forming a part hereof which disclose by way of example but without limitation suitable structural embodiments of the invention.

In the drawings:

Fig. 1 is a more or less diagrammatic longitudinal half section of a coupling embodying the invention, with the parts adjusted for a fully open circuit;

Fig. 2 is a similar view showing the parts of Fig. 1 adjusted to provide a partially throttled circuit;

Fig. 3 is a view similar to Fig. 1, illustrating another embodiment, with the parts adjusted for fully open circuit;

Fig. 4 shows the parts of Fig. 3 adjusted for partially throttled operation;

Fig. 5 is a view similar to Fig. 1 showing still another embodiment, adjusted for fully open circuit;

Fig. 6 shows the parts of Fig. 5 adjusted for partially throttled operation; and Fig. 7 shows the parts of Fig. 5 adjusted to fully throttled position.

Refering now to Figs. 1 and 2, the rotatably mounted casing of the coupling is indicated at 2, adapted to be rotated by any suitable source of power such as an engine. The casing 2, which constitutes the primary or driving member of the coupling, carries a ring of pump blades 6, and also supports, through bearing 8, one end of the secondary or driven member 10 which carries the ring of turbine blades 12. An axially shiftable member comprises a hollow shaft or sleeve portion 14 carried by suitable bearings 20 and 22 and is also engaged by the centering bearing 24 between the sleeve and the casing 2. Sleeve 14 carries the annular curved throttling wall 16, which as will be seen from the figures forms the outer wall or boundary of a part of the free flow section 15 of the circuit, that is, the section not occupied by blades and between the turbine outlet and the pump inlet.

As will further be seen from the figures, the throttling wall extends radially from the axis of rotation for a distance greater than the inner diameter of the core ring 28, so that a radially inner portion of the wall of the circuit provided by the core ring is in radially overlapping confronting relation to the throttling wall. The curvature of wall 16 is such, in relation to the confronting wall portion of the core ring 28, that when the throttling member is shifted to reduce the flow area of the circuit, a smoothly contracting and substantially perfect nozzle-like channel 30 of appreciable length in the direction of flow of fluid in the circuit is formed between the overlapping confronting walls, the minimum section of which is formed at 31 just ahead of the pump inlet. Obviously, by shifting the throttling member further to the left from the position shown in Fig. 2, the opening 31 can be closed to substantially cut off all circulation.

It is well known that the conditions of flow in a coupling are of such nature that the quantity (Q) of fluid circulated per unit time is maximum when the ratio, $n_2/n_1$, of the speed $n_2$ of the secondary member to the speed $n_1$ of the primary member, is zero, that is, when the secondary member is stalled. As the value of $n_2/n_1$ increases with increasing speed of the secondary member relative to that of the primary member, the value of Q decreases and would be zero with a value of $n_2/n_1=1$ in a theoretical coupling having no losses, at which condition the coupling would be incapable of transmitting torque between the members. Consequently, there is always a relatively rapid flow through the channel 30 as long as torque is being transmitted to the secondary member, but the maximum value of the latter can be reduced by the throttling of this channel. Due to the fact that the rate of circulation is maximum at and near stall conditions, couplings have a known characteristic of tending to overload the source of power under such conditions and this tendency can be counteracted by suitable throttling adjustment of the channel 30 to reduce the quantity of fluid circulated per unit time, or in other words, the rate of circulation.

The embodiment just described affords smooth and even variation in capacity as the adjustment is varied, but with the arrangement shown it is not possible to reduce the torque transmitting capacity to zero. The reason for this is that even with circulation cut off, turbulence created in the working fluid at the pump outlet and the turbine inlet exerts a certain minimum torque on the secondary member.

In order to reduce the minimum torque transmitting capacity to a lower value, an arrangement such as that shown in Figs. 3 and 4 may be employed. In these figures, the parts corresponding to those in Fig. 1 have been correspondingly designated, and as will be seen from the drawings, the principal difference between the two embodiments is that in the present instance the shiftable throttling wall 16 is located so as to provide the throttled channel 30 immediately ahead of the turbine inlet, rather than just ahead of the pump inlet as is the case in Fig. 1.

In the present embodiment, when the throttling member is moved to full throttled position, the only torque transmitted is that due to hydraulic ventilation or friction losses between the relatively moving parts and the turbulence at the turbine outlet and pump inlet. Other conditions being equal, the minimum torque transmitted by the present embodiment will be materially less than that of the embodiment of Fig. 1, due among other things to the fact that such turbulence is created at a much smaller radius from the axis of rotation than in the construction of Fig. 1.

By comparing Figs. 1 and 3 it will be seen that from the standpoint of compactness and relative simplicity of the throttling member, the form shown in Fig. 1 is preferable, so its use is advantageous in those applications where an extremely low value of minimum torque capacity is not critical. On the other hand, when the latter factor is critical, the use of the form shown in Fig. 3 is indicated.

If the coupling is operated at high speed, as for example with the casing (pump) directly connected to a high speed engine, even the arrangement shown in Fig. 3 may be inadequate to reduce the minimum torque transmitting capacity to substantially zero value, which may be a requirement. These severe conditions, however, may be met by utilizing a form of construction such as that shown in Figs. 5, 6 and 7, in which parts corresponding to those in the previously described embodiments are correspondingly designated.

In the present embodiment, the features of the embodiments of Figs. 1 and 3 are, in effect, combined to produce two throttling passages, one at the pump inlet as in Fig. 1 and one at the turbine inlet as in Fig. 3. This is accomplished by providing a disc 34, within the core structure, which is carried by the inner throttling wall 16 through the medium of a number of blade-like spokes 32, which, because of the fact that the throttling member is not subject to torque other than that created by fluid friction, may be relatively few in number and widely spaced, thus having negligible effect on the fluid flow.

At is outer periphery the disc 34 carries a throttling wall 36 which provides a part of the core structure forming the inner boundary of the free flow portion of the circuit between the pump outlet and the turbine inlet, the wall 36 being so curved relative to the curvature of the opposite wall portion of the casing as to provide a nozzle-like throttling channel 38 at the turbine inlet.

As will be seen from Fig. 6, when adjusted for throttled flow, two throttling channels, 30 and 38, are provided, each acting to uniformly and with minimum turbulence reduce the rate of circulation. More important, however, is the fact that when adjusted for full throttling as shown in Fig. 7, the pump and turbine members are completely separated from each other, so far as the fluid circuit is concerned, by the two throttling walls 16 and 36. Thus the only torque transmitted when the circuit is fully throttled is that arising from fluid and bearing friction, which is of negligible value so that from the practical point of view the coupling can be considered as having a definite zero torque characteristic.

Obviously many variations of the structures shown may be employed without departing from the principles of the invention, as for example by applying the double throttling arrangement of Fig. 5 to a construction in which the throttling member encloses the pump rather than the turbine to provide the desired throttling at the pump and turbine inlets. Also, while less desirable, the part 36, in a double throttling arrangement can be made in the form of the ordinary ring type gate valve. In the embodiments shown, the throttling member is shown as freely rotatable relative to the pump and turbine members but if desired may be splined to rotate with either of the latter members.

So far as the adjustment of the throttling member is concerned, this may be accomplished in any desired manner, either manually or automatically in response to variations in one or more factors such as speed and load or combinations thereof. In the illustrative examples the throttling member is shown as provided with a peripheral groove 18 adapted to receive, as shown in Fig. 5, the opposed pins of a shift fork 52, pivoted at 54 to a rotationally fixed frame or abutment 50 and actuated by the manually operable control lever 56. Obviously many other expedients of known kind may be employed.

While the invention is primarily adapted for use with hydrodynamic couplings of the so-called two element type having only pump and turbine torque-significant members, and has been disclosed by way of example as applied to such devices, the principles of the invention do not preclude its use in hydrodynamic power transmissions which include reaction members for the purpose of producing torque multiplication and which in accordance with known principles may be effective during all or only certain conditions of operation of the transmission. The invention is therefore to be understood as embracing all forms of apparatus falling within the scope of the appended claims.

What is claimed:

1. A hydrodynamic transmission of the closed circuit type comprising a primary member and a secondary member providing rings of pump and turbine blades located in the circuit and an adjustable throttling member movable axially to reduce the cross sectional area of a portion of the circuit, said throttling member having a wall portion defining a part of the wall of the circuit, said wall portion being at least in part radially coextensive with an axially stationary confronting wall portion of the circuit, and said radially coextensive wall portions being shaped to provide between them, in all throttling positions of adjustment of the throttling member, a throttling channel of smoothly decreasing cross sectional area in the direction of flow of the working fluid in the circuit.

2. A hyrodynamic transmission of the closed circuit type comprising a primary member and a secondary member providing rings of pump and turbine blades located in the circuit and an adjustable throttling member movable axially to reduce the cross sectional area of a portion of the circuit, said throttling member having a wall portion defining a part of the wall of the circuit, said wall portion being at least in part radially coextensive with an axially stationary confronting wall portion of the circuit, and said radially coextensive portions being shaped to provide between them, in all throttling positions of adjustment of the throttling member, a throttling channel of diminishing cross sectional area in the direction of flow of the working fluid in the circuit, said passage being located with its outlet adjacent to the inlet of one of said rings of blades.

3. A hydrodynamic transmission of the closed circuit type comprising a primary member and a secondary member providing rings of pump and turbine blades located in the circuit and an adjustable throttling member movable axially to reduce the cross sectional area of a portion of the circuit, said throttling member having a wall portion defining a part of the wall of the circuit, said wall portion being at least in part radially coextensive with an axially stationary confronting wall portion of the circuit, and said radially coextensive portions being shaped to provide between them, in all throttling positions of adjustment of the throttling member, a throttling channel of diminishing cross sectional area in the direction of flow of the working fluid in the circuit, said passage being located with its outlet adjacent to the inlet of a ring of pump blades.

4. A hydrodynamic transmission of the closed circuit type comprising a primary member and a secondary member providing rings of pump and turbine blades located in the circuit and an adjustable throttling member movable axially to reduce the cross sectional area of a portion of the circuit, said throttling member having a wall portion defining a part of the wall of the circuit, said wall portion being at least in part radially coextensive with an axially stationary confronting wall portion of the circuit, and said radially coextensive portions being shaped to provide between them, in all throttling positions of adjustment of the throttling member, a throttling channel of diminishing cross sectional area in the direction of flow of the working fluid in the circuit, said passage being located with its outlet adjacent to the inlet of a ring of turbine blades.

5. A hydrodynamic transmission of the closed circuit type comprising a primary member and a secondary member providing rings of pump and turbine blades located in the circuit and an adjustable throttling member movable to reduce the cross sectional areas of the circuit at two different places, one of said places being located adjacent to the inlet of a ring of pump blades and the other of said places being located adjacent to the inlet of a ring of turbine blades.

6. A structure as set forth in claim 5 in which said throttling member includes a throttling wall portion at one of said places being at least in part radially coextensive with and coacting with a confronting portion of the wall of the circuit to provide a throttling passage of diminishing cross section in the direction of flow of the working fluid in the circuit.

7. A structure as set forth in claim 5 in which said throttling member includes two separate throttling wall portions each at least in part radially coextensive with and coacting respectively with confronting portions of the wall of the circuit at each of said places to provide throttling passages each of diminishing cross section in the direction of flow of the working fluid in the circuit.

8. A hydrodynamic coupling of the rotating casing type having aligned primary and secondary members carrying rings of pump and turbine blades respectively, said casing constituting a part of one of said members and said members providing an annular working chamber for circulation of working fluid in a closed path of flow between said pump and turbine blades and said members including parts forming a core ring in said chamber whereby to provide a closed circuit for circulation of working fluid in which said blades are located, and a throttling member carried by one of the first mentioned members and axially shiftable thereon, said member having a throttling wall portion at least in part radially coextensive with an axially stationary confronting wall portion of said core ring and coacting therewith to form, in all throttling positions of the throttling member, a nozzle-like throttling passage in said circuit diminishing in cross sectional area in the direction of flow of the working fluid in the circuit and discharging fluid adjacent to the inlet of one of said rings of blades.

9. A coupling as set forth in claim 8 in which said throttling wall is locate in the radially inner portion of the circuit and said throttling passage discharges to a ring of pump blades located in a generally radially extending portion of the circuit.

10. A coupling as set forth in claim 8 in which said throttling wall is located in the radially outer portion of the circuit and said throttling passage discharges to a ring of turbine blades located in a generally radially extending portion of the circuit.

11. A hydrodynamic coupling of the rotating casing type having aligned primary and secondary members carrying rings of pump and turbine blades respectively, said casing constituting a part of one of said members and said members providing an annular working chamber for circulation of working fluid in a closed path of flow between said pump and turbine blades and said members including parts forming a core ring in said chamber whereby to provide a closed circuit for circulation of working fluid in which said blades are located, and a throttling member carried by one of the first mentioned members and axially shiftable thereon, said throttling member having two throttling portions, each of said portions being at least in part radially coextensive respectively with axially stationary confronting wall portions of the working chamber to provide, in all throttling positions of the throttling member, throttling passages in the circuit located to discharge fluid respectively to the inlet of a ring of pump blades and to the inlet of a ring of turbine blades.

12. A coupling as set forth in claim 11 in which one of the throttling portions of the throttling member is located in the radially inner portion of the circuit to provide a throttling passage at the inlet of a ring of pump blades and the other of the throttling portions of the throttling member is located in the radially outer portion of the circuit to provide a throttling passage at the inlet of a ring of turbine blades.

13. A coupling as set forth in claim 12 in which the throttling member includes a portion extending through said core ring for connecting said two throttling portions.

References Cited in the file of this patent

UNITED STATES PATENTS

| Number | Name | Date |
| --- | --- | --- |
| 1,203,265 | Radcliffe | Oct. 31, 1916 |
| 1,863,128 | Salerni | June 14, 1932 |
| 1,972,175 | Vessey | Sept. 4, 1934 |
| 2,350,865 | Banner | June 6, 1944 |
| 2,358,473 | Patterson | Sept. 19, 1944 |
| 2,384,841 | Lang et al. | Sept. 18, 1945 |
| 2,580,072 | Burnett | Dec. 25, 1951 |